US007818520B2

(12) United States Patent
Chen

(10) Patent No.: US 7,818,520 B2
(45) Date of Patent: Oct. 19, 2010

(54) METHOD OF SPECIFYING ACCESS SEQUENCE OF A STORAGE DEVICE

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 872 days.

(21) Appl. No.: 11/709,753

(22) Filed: Feb. 23, 2007

(65) Prior Publication Data

US 2008/0209137 A1 Aug. 28, 2008

(51) Int. Cl.
*G06F 12/00* (2006.01)
*G06F 3/00* (2006.01)
*G06F 9/46* (2006.01)

(52) U.S. Cl. ............................ 711/158; 710/6; 711/112; 711/151; 711/205; 711/206; 711/207; 718/100; 718/103

(58) Field of Classification Search .................. 710/6; 711/112, 151, 158, 205, 206, 207; 718/100, 718/103
See application file for complete search history.

(56) References Cited

U.S. PATENT DOCUMENTS 5,937,205 A * 8/1999 Mattson et al. ................ 710/6
7,337,285 B2 * 2/2008 Tanoue ........................ 711/158

* cited by examiner

*Primary Examiner*—Kevin L Ellis
*Assistant Examiner*—Mehdi Namazi
(74) *Attorney, Agent, or Firm*—Bacon & Thomas, PLLC

(57) ABSTRACT

The present invention is to provide a method of specifying access sequence of a storage device, wherein queues with different priority are created in the storage device for recording access requests from at least one server at the front-end of the storage device to manage the access operation, and are recorded corresponding to the front-end servers and the priority thereof respectively via a priority table. When the front-end server makes an access request, the request will be added to the corresponding queue according to the source front-end server, and each queue will be processed according to the priority thereof. The maximum workload of the access request processed every single time of each queue is set respectively. Thus, the access requests of the queues with higher priority will be processed within a shorter time.

8 Claims, 4 Drawing Sheets

METHOD OF SPECIFYING ACCESS SEQUENCE OF A STORAGE DEVICE

FIELD OF THE INVENTION

The present invention relates to a storage device, more particularly to a method of specifying sequence of accessing a storage device in a server system by at least one server at the front-end of the storage device.

BACKGROUND OF THE INVENTION

The technologies nowadays innovate and advance by time, and all kinds of electronic products such as personal computer, personal digital assistant, server, disk array storage device, printer, notebook and smart phone etc. keep emerging. Transmitting electronic information such as voice, image, email and database etc. via electronic products makes the communication between enterprises more rapid and convenient, thereby transforms the conventional business model into global aspect and increases the need of the storage devices conspicuously.

To fulfill the needs of the enterprises, the manufacturers of storage device have invented the disk array storage device, which is capable of storing massive data and with high security. Besides, the disk array storage device may be connected to several servers simultaneously, so the network services provided by each server are able to access it respectively. Hence, the quality and performance of the disk array storage device is the key to the operation of the servers.

The disk array storage device processes each access request from each server in the order of receipt. In other words, only when the processing of the present access request is completed will the next access request be processed. And because the disk array storage device fails to specify the priority of the access requests from the servers according to specific criteria (such as the importance of the request), there would be problems like poor network service quality and unstable performance of the servers etc.

SUMMARY OF THE INVENTION

For the purpose of solving the problems stated above, after hard work of research and experiments for a long time, the inventor has developed a method of specifying the access sequence of a storage device of the present invention.

One of the objective of the present invention is to provide a method of specifying access sequence of a storage device applied to a server system, wherein queues with different priority are created in the storage device of the server system for recording the access requests from at least one server at the front-end of the storage device to manage the access operation. The method of specifying the access sequence of a storage device records the queues corresponding to the front-end servers and the priority thereof in a priority table, wherein each front-end server corresponds to one of the queues respectively according to the priority table. When one of the front-end servers makes an access request, the request will be added to the corresponding queue according to which front-end server is the source, and each queue will be processed according to the priority thereof. Besides, the maximum workload of the access request processed every single time is set respectively by each queue, and queues with different priority may have their own preferred maximum workload, for example, queues with higher priority are with larger maximum workload. Hence, the access requests of the queues with higher priority will be processed within a shorter time, and it takes a longer time for the access requests of the queues with lower priority to be processed on the contrary.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENT

Figure 1:
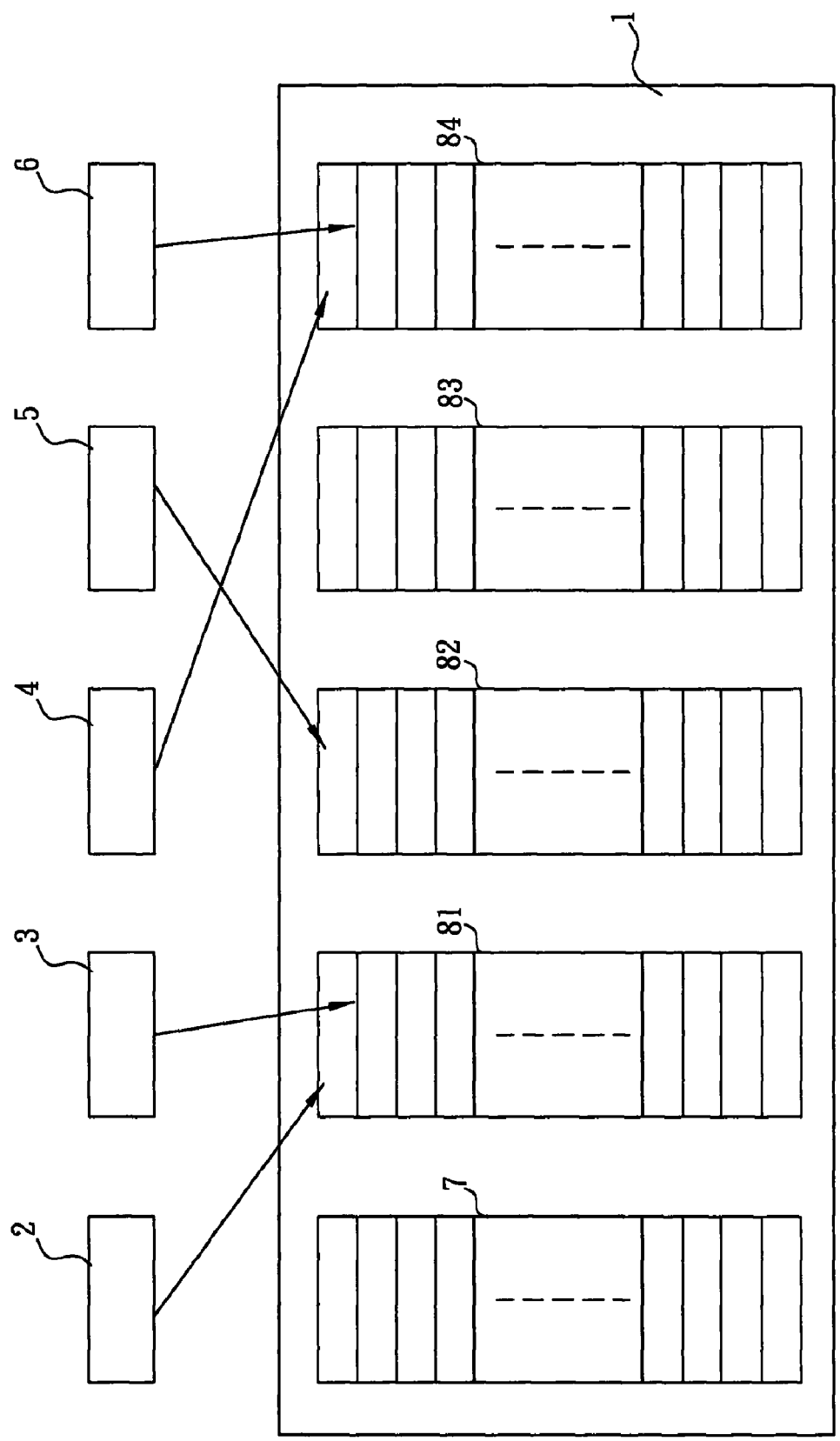
FIG. 1 shows the structure of each server and the storage device of a preferred embodiment of the present invention.

Please refer to FIG. 1, the invention of method of specifying the access sequence of a storage device is applied to a server system which comprises a storage device 1 and a plurality of servers (2~6) at the front-end of the storage device 1 and accessing data in the storage device 1. In the server system, there are a plurality of queues (81~84) with different priority which record access requests of the front-end servers (2~6) to manage the access operation. Also, there is a priority table 7 with records corresponding to queues (81~84) in the server system, wherein each record comprises columns of priority, name of the queue, designated server, maximum workload (70, 72, 74, 76) and so on. Each front-end server (2~6) corresponds to one of the queues (81~84), and the column of priority 70 of each record is with different priority, so each queue (81~84) is also with different priority. Each front-end server (2~6) may designate one of the queues (81~84) to record the access request of the access operation, that means each queue may record access requests from more than one front-end server (2~6). Please refer to FIG. 2, though priority table 7 comprises column of order of processing 78, still the order of processing of each queue (81~84) may be advanced or postponed directly by a program according to the value of the column of priority 70. The column of maximum workload 76 is utilized to record the maximum workload of the access request processed every single time of each queue (8~84) with different priority, and set preferred maximum workload of queues with different priority, for example, queues with higher priority has a value in the column of priority 70 smaller than the others, which corresponds to a value in the column of maximum workload larger than the others. Please refer to FIG. 3, the steps of storage device 1 processing the access request from any one of the front-end servers (2~6) comprise:

(11) determining which front-end server is the source of an access request, such as retrieving source information comprising the source address or the name of the source server from the access request to determine which front-end server sent the access request;

(12) acquiring the queue corresponding to the source server according to the columns of designated server 74 and name of the queue 72 of the priority table 7, since in the priority table 7, each front-end server (2~6) corresponds to one of the queues (81~84) so that the corresponding queue may be acquired via comparing each record of the priority table 7 with the front-end server; and

(13) adding the access request to the queue corresponding to the source server for processing, thereby the number of work waiting for processing of said queue will increase by one.

Figure 4:
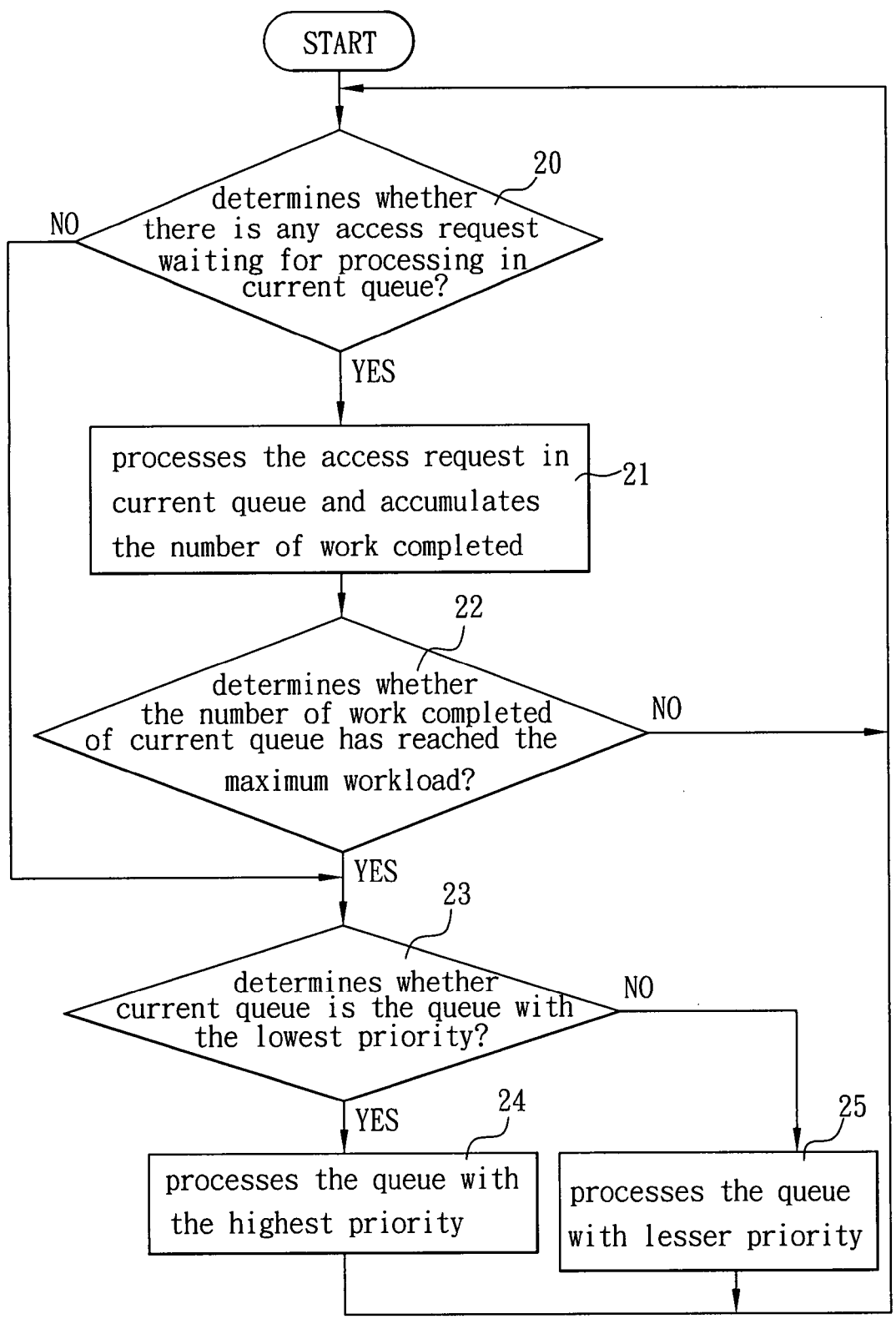
FIG. 4 is a flow chart of a preferred embodiment of the present invention showing the steps of the storage device proceeding processing according to the order of processing.

Please refer to FIG. 4, in one embodiment of the present invention, the steps of the storage device 1 processing the access request stored in the queues (81~84) according to the method of specifying the access sequence comprise:

(20) determining whether or not there is any access request waiting for processing in current queue, going to step (21) when affirmative, otherwise going to step (23);

(21) processing the access request in the current queue, and accumulating the number of work completed as a number of work;

(22) determining whether or not the number of completed work of the current queue has reached the maximum workload, going to step (23) when affirmative, otherwise going to step (20);

(23) determining whether or not the current queue is the queue with the lowest priority, going to step (24) when affirmative, otherwise going to step (25);

(24) processing a queue with a highest priority, then going to step (20); and

(25) processing a next queue with a priority lesser than the current queue, then going to step (20).

As stated above, the queue with high priority has a bigger maximum workload, so the access request thereof will be processed within a shorter time, on the contrary, the queue with low priority has a lesser maximum workload, so it takes a longer time for the access request thereof to be processed, therefore enables the operation of specifying the access sequence.

Also, via allocating access requests from each front-end server (2~6) to the corresponding queues (81~84), the objective of specifying the access sequence of the front-end servers (2~6) can be accomplished.

Figure 2:
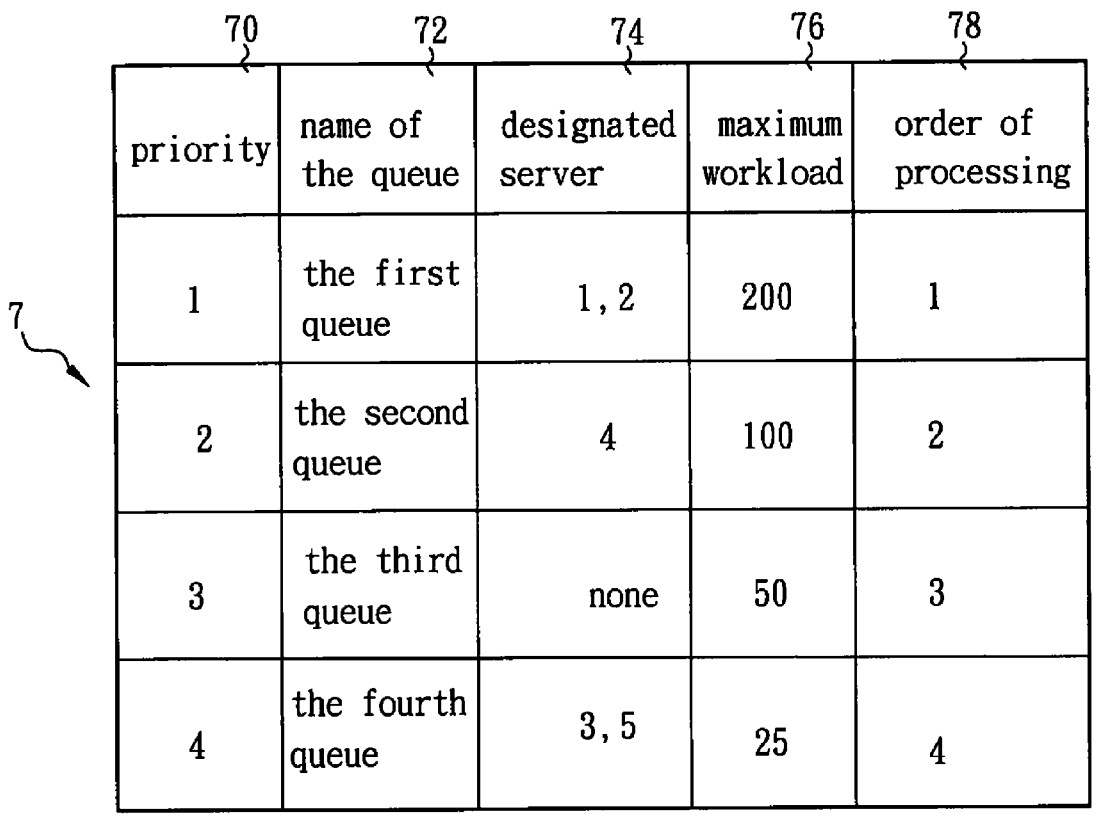
FIG. 2 shows the priority table of a preferred embodiment of the present invention.
Figure 3:
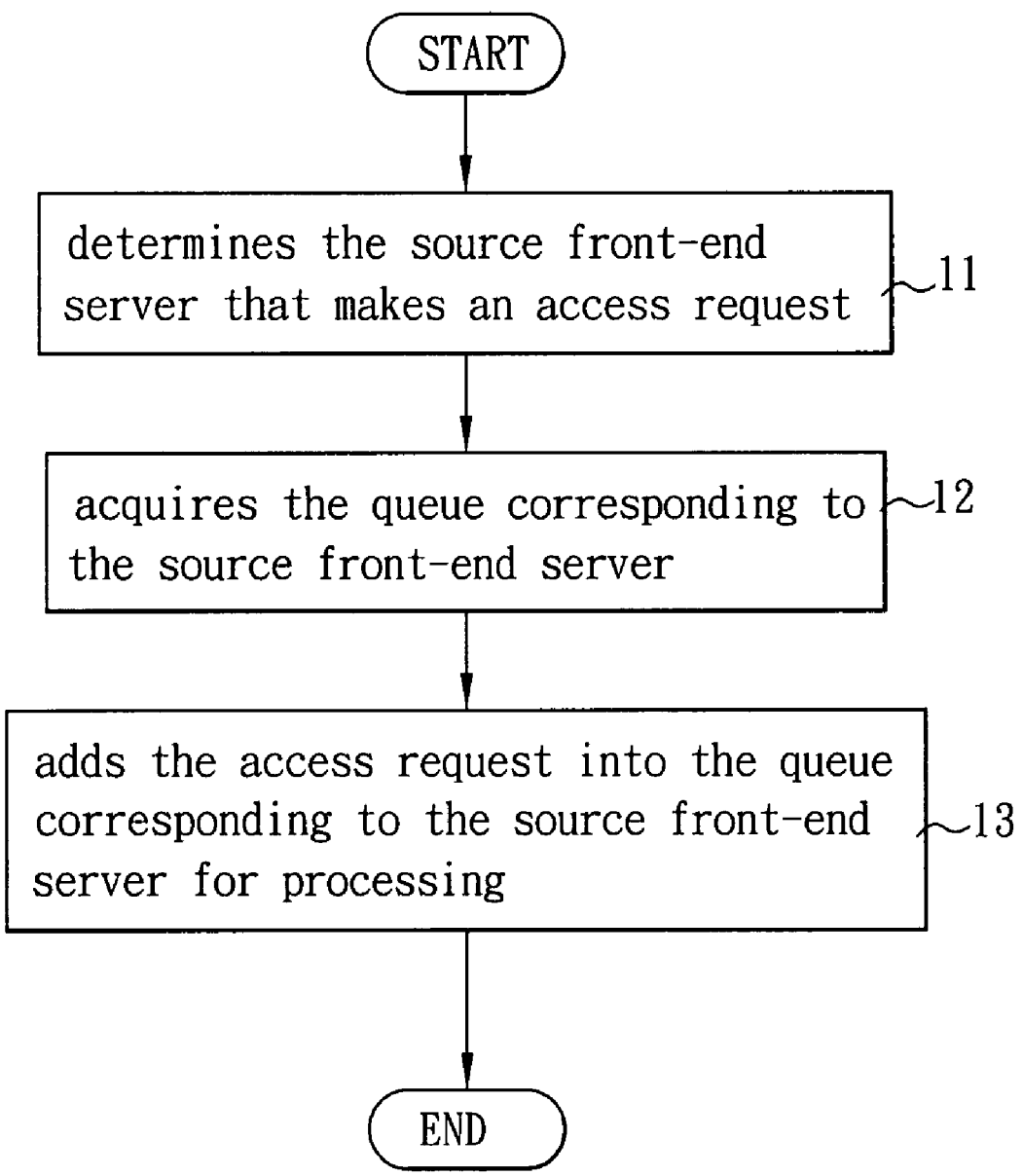
FIG. 3 is a flow chart of a preferred embodiment of the present invention showing the steps of the storage device processing the access request received.

For the purpose of making the features of present invention more clear and obvious, an embodiment thereof is described as follows. Please refer to FIGS. 1 and 2, provided that the storage device 1 is designated to five front-end servers (2~6) for access, and there are four queues (81~84) with different priority in the storage device 1, that is, the priority table 7 has four records which record four levels of priority of said four queues (81~84) respectively, wherein said four levels of priority are priority one to four in a descent order. The columns of order of processing 78 of the priority table 7 sequentially record the first to the fourth queues (81~84) with priority one to four, and the columns of the designated server 74 of the priority table 7 record the states that the first server 2 and the second server 3 are designated to the first queue 81 with priority one, the fourth server 5 is designated to the second queue 82 with priority two, the third server 4 and the fifth server 6 are designated to the fourth queue 84 with priority four, and no server is designated to the third queue 83 with priority three. The columns of maximum workload of the priority table 7 record the maximum workload of the first to the fourth queues of 200, 100, 50, and 25 respectively. And the columns of name of the queue of the priority table 7 record the queues corresponding to each priority.

As stated above, the storage device 1 adds the access requests from the first server 2 and the second server 3 to the first queue 81, the access requests from the fourth server 5 to the second queue 82, and the access requests from the third server 4 and the fifth server 6 to the fourth queue 84. Either when the amount of the access requests of the first queue 81 processed reaches 200 or there is no more access request to be processed, the storage device 1 proceeds with the second queue 82. When the amount of the access requests of the second queue 82 processed reaches 100 or there is no more access request to be processed, the storage device 1 proceeds with the third queue 83. Due to that no server is designated priority 3, the operation will move straight to the fourth queue 84 since there won't be any access request in the third queue 83. When the amount of the access requests of the fourth queue 84 processed reaches 25 or there is no more access request to be processed, the operation will go back to the first queue 81. Thus, adding access requests of each front-end server (2~6) to queues (81~84) with different priority according to priority table 7 enables the access requests in queue 81 with high priority to be processed within a shorter time while it takes a longer time for the access requests in queue 84 with low priority to be processed, thereby the objective of specifying the access sequence of the front-end servers (2~6) to the storage device 1 may be accomplished.

While the invention herein disclosed has been described by means of specific embodiments, numerous modifications and variations could be made thereto by those skilled in the art without departing from the scope and spirit of the invention set forth in the claims.

What is claimed is:

1. A method of specifying access sequence of a storage device, which is applied to a server system comprising a storage device, a plurality of front-end servers located at a front-end of said storage device, and a priority table, wherein said priority table comprises a plurality of records, and each of said records corresponds to a queue and comprises a column of at least one designated front-end server, a column of name of said queue, a column of maximum workload of said queue and a column of priority of said record, and said priorities of said records are different from each other, said method comprising the steps of:

determining said front-end server from an access request received by said storage device, wherein said access request represents a request of access operation to said storage device from said front-end server;

acquiring the name of said queue corresponding to said front-end server according to said designated front-end server in said priority table;

adding said access request to said queue corresponding to said front-end server for waiting to be processed;

determining whether or not there is a current queue having said access request stored in said queue and waiting to be processed;

processing said access request in said current queue when said current queue exists, and accumulating numbers of processing said access request as a number of work of said current queue;

determining whether or not said number of work of said current queue has reached said maximum workload corresponding thereto;

determining whether or not said current queue is a queue having a lowest priority when said number of work of said current queue has reached said maximum workload corresponding thereto; and repeating the above steps for executing a next queue having a priority lesser than that of said current queue when said current queue is determined not said queue having said lowest priority.

2. A method of claim 1 wherein, when determined there is no more access request waiting to be processed in said current queue, said method proceeds with the step of determining whether said current queue is said queue having said lowest priority.

3. A method of claim 1 wherein, when determined said number of work of said current queue not yet reaches said maximum workload corresponding thereto, said method proceeds with the step of processing said access request in said current queue and accumulating said number of work thereof.

4. A method of claim 1 wherein, when determined said current queue is said queue having said lowest priority, said method executes a queue having a highest priority and proceeds with the step of determining whether there is any access request waiting to be processed in said queue having said highest priority.

5. A method of specifying access sequence of a storage device, which is applied to a server system comprising a storage device, a plurality of front-end servers located at a front-end of said storage device, and a priority table, wherein said priority table comprises a plurality of records, and each of said records corresponds to a queue and comprises a column of at least one designated front-end server, a column of name of said queue, a column of maximum workload of said queue and a column of priority of said record, and a record having a higher priority has a value in said column of priority smaller than the others and corresponds to a value in said column of maximum workload larger than the others, said method comprising the steps of:

acquiring the name of said queue corresponding to said front-end server according to said designated front-end server in said priority table;

adding said access request to said queue corresponding to said front-end server for waiting to be processed;

determining whether or not there is a current queue having said access request stored in said queue and waiting to be processed;

processing said access request in said current queue when said current queue exists, and accumulating numbers of processing said access request as a number of work of said current queue;

determining whether or not said number of work of said current queue has reached said maximum workload corresponding thereto;

determining whether or not said current queue is a queue having a lowest priority when said number of work of said current queue has reached said maximum workload corresponding thereto; and repeating the above steps for executing a next queue having a priority lesser than that of said current queue when said current queue is determined not said queue having said lowest priority.

6. A method of claim 5 wherein, when determined there is no more access request waiting to be processed in said current queue, said method proceeds with the step of determining whether said current queue is said queue having said lowest priority.

7. A method of claim 5 wherein, when determined said number of work of said current queue not yet reaches said maximum workload corresponding thereto, said method proceeds with the step of processing said access request in said current queue and accumulating said number of work thereof.

8. A method of claim 5 wherein, when determined said current queue is said queue having said lowest priority, said method executes a queue having a highest priority and proceeds with the step of determining whether there is any access request waiting to be processed in said queue having said highest priority.

* * * * * determining said front-end server from an access request received by said storage device, wherein said access request represents a request of access operation to said storage device from said front-end server;